(12) United States Patent
Luo et al.

(10) Patent No.: US 10,449,951 B2
(45) Date of Patent: Oct. 22, 2019

(54) DRIVE MECHANISM FOR A MOTOR VEHICLE, AND METHOD FOR OPERATING A DRIVE MECHANISM FOR A MOTOR VEHICLE

(71) Applicant: Robert Bosch GmbH, Stuttgart (DE)

(72) Inventors: Benjin Luo, Stuttgart (DE); Michael Lehner, Pforzheim (DE); Rainer Gasper, Korntal-Muenchingen (DE); Thomas Huber, Daisbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/750,444

(22) PCT Filed: Jul. 12, 2016

(86) PCT No.: PCT/EP2016/066530
§ 371 (c)(1),
(2) Date: Feb. 5, 2018

(87) PCT Pub. No.: WO2017/021109
PCT Pub. Date: Feb. 9, 2017

(65) Prior Publication Data
US 2018/0257639 A1    Sep. 13, 2018

(30) Foreign Application Priority Data
Aug. 3, 2015  (DE) ........................ 10 2015 214 751

(51) Int. Cl.
*B60W 20/40*    (2016.01)
*B60K 6/48*    (2007.10)
(Continued)

(52) U.S. Cl.
CPC ............... *B60W 20/40* (2013.01); *B60K 6/36* (2013.01); *B60K 6/48* (2013.01); *B60K 6/547* (2013.01);
(Continued)

(58) Field of Classification Search
None
See application file for complete search history.

(56) References Cited

U.S. PATENT DOCUMENTS

2002/0033059 A1* 3/2002 Pels .................. B60K 6/26
74/329
2011/0288703 A1 11/2011 Falkenstein et al.
(Continued)

FOREIGN PATENT DOCUMENTS

DE    102007050656    4/2009
DE    102008040692    1/2010
(Continued)

OTHER PUBLICATIONS

International Search Report for Application No. PCT/EP2016/066530 dated Oct. 17, 2016 (English Translation, 2 pages).

*Primary Examiner* — Justin Holmes
(74) *Attorney, Agent, or Firm* — Michael Best & Friedrich LLP

(57) ABSTRACT

Drive mechanism (1) for a motor vehicle (6), comprising a dual clutch transmission (10) that includes a first powertrain (13), which can be connected to a first drive unit (2) via a first clutch (21), and a second powertrain (14), which can be connected to the first drive unit (2) via a second clutch (22), the first powertrain (13) being securely coupled to a second drive unit (3); when shifting gears in the dual clutch transmission (10), the second drive unit (3) supplies a predefined drive torque.

7 Claims, 3 Drawing Sheets

(51) Int. Cl.

| | | |
|---|---|---|
| *B60K 6/547* | (2007.10) |
| *F16H 61/688* | (2006.01) |
| *F16H 3/00* | (2006.01) |
| *B60W 20/10* | (2016.01) |
| *B60W 20/15* | (2016.01) |
| *F16H 63/50* | (2006.01) |
| *B60K 6/36* | (2007.10) |
| *B60W 10/02* | (2006.01) |
| *B60W 10/04* | (2006.01) |
| *B60W 10/113* | (2012.01) |
| *F16H 61/04* | (2006.01) |

(52) U.S. Cl.
CPC ............ *B60W 10/02* (2013.01); *B60W 10/04* (2013.01); *B60W 10/113* (2013.01); *B60W 20/10* (2013.01); *B60W 20/15* (2016.01); *F16H 3/006* (2013.01); *F16H 61/688* (2013.01); *F16H 63/502* (2013.01); *B60K 2006/4808* (2013.01); *B60K 2006/4825* (2013.01); *B60W 2510/0657* (2013.01); *B60W 2710/021* (2013.01); *B60W 2710/0666* (2013.01); *B60W 2710/083* (2013.01); *B60W 2710/10* (2013.01); *B60Y 2200/92* (2013.01); *F16H 2061/0433* (2013.01); *Y02T 10/626* (2013.01); *Y02T 10/6221* (2013.01); *Y02T 10/6252* (2013.01); *Y10S 903/909* (2013.01); *Y10S 903/919* (2013.01); *Y10S 903/93* (2013.01); *Y10S 903/945* (2013.01); *Y10S 903/946* (2013.01)

(56) References Cited

U.S. PATENT DOCUMENTS

| | | | |
|---|---|---|---|
| 2012/0129649 A1* | 5/2012 | Kaltenbach | B60K 6/48 477/5 |
| 2014/0157923 A1* | 6/2014 | Lee | F16H 3/08 74/330 |
| 2014/0249727 A1* | 9/2014 | Faust | F16H 61/688 701/58 |
| 2015/0149016 A1 | 5/2015 | Salton | |
| 2015/0367841 A1* | 12/2015 | Takahashi | B60K 6/387 701/22 |
| 2016/0107632 A1* | 4/2016 | Yang | B60W 20/30 701/22 |

FOREIGN PATENT DOCUMENTS

| | | |
|---|---|---|
| DE | 102008041565 | 3/2010 |
| EP | 2481956 | 8/2012 |

* cited by examiner

DRIVE MECHANISM FOR A MOTOR VEHICLE, AND METHOD FOR OPERATING A DRIVE MECHANISM FOR A MOTOR VEHICLE

BACKGROUND OF THE INVENTION

The present invention relates to a drive mechanism for a motor vehicle, to a motor vehicle with such a drive mechanism, and to a method for operating a drive mechanism for a motor vehicle. In particular, the present invention relates to a drive mechanism and to a method for operating a drive mechanism for hybrid vehicles.

Modern motor vehicles can have a plurality of different drive units. For example, hybrid or plug-in hybrid vehicles are known which also have an electric drive in addition to an internal combustion engine. Internal combustion engine and electric drive can be used here either alternatively or optionally also simultaneously (in parallel) in order to drive the vehicle. A drive torque provided by the respective drive unit is transmitted here to the wheels via a transmission. What are referred to as dual clutch transmissions (DCT) are known in particular in this connection as the transmission. Such dual clutch transmissions combine two transmission shafts which run one inside the other and each have a separate clutch.

German patent application DE 10 2008 041 565 A1 discloses a hybrid drive mechanism of a motor vehicle, comprising two different drive units. It is provided here that, during a changeover of the coupling of one drive unit, a torque generated by the drive unit is provided by partial closing of a clutch of the further drive unit.

SUMMARY OF THE INVENTION

To this end, the present invention, according to a first aspect, provides a drive mechanism for a motor vehicle, comprising a dual clutch transmission with a first drive train which is connectable to a first drive unit via a first clutch, and with a second drive train which is connectable to the first drive unit via a second clutch, wherein the first drive train is fixedly coupled to a second drive unit, and wherein, during a changeover of the coupling of the dual clutch transmission, a predetermined drive torque is provided by the second drive unit.

According to this aspect, the present invention provides a drive mechanism for a motor vehicle, comprising a dual clutch transmission. The dual clutch transmission comprises a first drive train which is connectable to a first drive unit via a first clutch, and a second drive train which is connectable to the first drive unit via a second clutch. The first drive train is furthermore fixedly coupled to a second drive unit. During the changeover of the coupling of the dual clutch transmission, a predetermined drive torque is provided by the second drive unit.

According to a further aspect, the present invention provides a method for operating a drive mechanism for a motor vehicle, comprising the steps of providing a first drive torque by means of a first drive unit to one of the drive trains of a dual clutch transmission, providing a transition torque by means of a second drive unit which is fixedly coupled to one of the drive trains of the dual clutch transmission, changing over the coupling of the dual clutch transmission, and providing a second drive torque by means of the first drive unit to one of the drive trains of the dual clutch transmission.

According to this aspect, to this end the present invention provides a method for operating a drive mechanism, with the steps of providing a first drive torque by means of a first drive unit to one of the drive trains of a dual clutch transmission; providing a transition torque by means of a second drive unit which is fixedly coupled to one of the drive trains of the dual clutch transmission; changing over the coupling of the dual clutch transmission; and providing a second drive torque by means of the first drive unit to one of the drive trains of the dual clutch transmission.

The present invention is based on the concept of providing the drive torque during a shifting operation in a dual clutch transmission by means of a further drive unit during the time of the shifting operation. Said further drive unit is coupled fixedly here to one of the drive trains of the dual clutch transmission. A clutch or similar is not required for such a fixed coupling between drive train of the dual clutch transmission and the further drive unit. By contrast, the first drive unit is connectable to the first drive train and to the second drive train by means of suitable clutches. By closing the corresponding clutch, a force-fitting connection can be achieved between drive unit and the respective drive train. By opening the corresponding clutch, the drive unit can be decoupled from the corresponding drive train.

By provision of a drive torque to one of the drive trains of the dual clutch transmission during the shifting operation, shifting without an interruption in tractive force can be made possible. During the entire shifting operation, the desired drive torque is always available at the output of the dual clutch transmission. An interruption or else a severe fluctuation in the drive torque at the output of the transmission can thus be avoided. This affords an increase in the driving comfort.

Since the drive torque is provided during the shifting operation by means of a separate drive unit coupled fixedly to one of the drive trains of the transmission, it is furthermore also possible to change between two different gears within one and the same partial transmission of a dual clutch transmission without an interruption in the drive torque at the output of the transmission occurring.

During the shifting operation, the required drive torque can be taken over here by means of the further drive unit which is fixedly coupled to one of the drive trains. Consequently, no slip which would load the clutches arises during the opening or closing of the clutches between the first drive unit and the respective drive trains. On account of said lower loadings of the clutches during the shifting operation, the service life of the clutches can therefore be increased. Furthermore, it is also possible to correspondingly optimize the clutches and to design them to be more cost-effective because of the lower loadings of the individual clutches.

According to one embodiment, the drive mechanism furthermore comprises a control device. The control device is designed to determine a first drive torque, which is provided by the first drive unit, prior to the changeover of the coupling of the dual clutch transmission. The drive torque provided by the second drive unit can be set here on the basis of the determined first drive torque. The drive torque from the first drive unit can be determined herein on the basis of sensed sensor parameters. In addition or alternatively, it is also possible to determine the operating parameters of the first drive unit and, on the basis of said operating parameters, to calculate a drive torque which is provided by the first drive unit. Subsequently, the settings during the changeover of the coupling of the dual clutch transmission can be adapted on the basis of the determined drive torque of the first drive unit. This permits a particularly comfortable changeover of the coupling of the dual clutch transmission.

According to one embodiment, the drive mechanism comprises a control device which is designed to determine an output torque, which is provided by the first drive unit at the output of the dual clutch transmission, prior to the changeover of the coupling of the dual clutch transmission. The drive torque provided by the second drive unit is set on the basis of the determined output torque.

According to a further embodiment, the control device enables a changeover of the coupling of the dual clutch transmission if the second drive unit can provide a drive torque which corresponds to the determined first drive torque from the first drive unit or to the determined output torque. Alternatively, it is also possible to enable the changeover of the coupling of the dual clutch transmission if the maximum drive torque which can be provided by the second drive unit falls below the output torque or the drive torque from the first drive unit by not more than a predetermined threshold value. This makes it possible to ensure that the changeover of the coupling of the dual clutch transmission takes place without significant losses of comfort due to a drop in the tractive force during the coupling changeover operation.

According to a further embodiment, the control device is designed to set a drive torque, which corresponds to the determined output torque or to the determined first drive torque from the first drive unit, at the second drive unit. By this means, during the changeover of the coupling in the dual clutch transmission, the required drive torque is completely taken over by the second drive unit, and therefore no interruption to the drive force at the output of the transmission occurs. Furthermore, the clutches which connect the first drive unit to the dual clutch transmission are thereby also relieved of load during the changeover of the coupling.

According to a further embodiment, the control device is furthermore designed to reduce the drive torque provided by the second drive unit after the changeover of the coupling of the dual clutch transmission is finished. In particular, it is possible to completely reduce the drive torque provided by the second drive unit to zero after the changeover of the coupling is finished. For this purpose, after the changeover of the coupling is ended, the drive torque can be completely taken over again by the first drive unit.

According to a further aspect, the present invention provides a motor vehicle with a drive mechanism according to the invention. In particular, the second drive unit here can comprise an electric motor. This makes it possible to produce a hybrid vehicle, in particular a hybrid plug-in vehicle, which has particularly comfortable shifting without an interruption in tractive force and with the advantages described above. The first drive unit here can comprise, for example, an internal combustion engine. By use of an electric motor as second drive unit, the drive torque required during the changeover of the coupling can be provided very rapidly and precisely here.

According to a further embodiment, the method for operating a drive mechanism for a motor vehicle comprises a step for determining the first drive torque which is provided to one of the drive trains of the dual clutch transmission by means of the first drive unit prior to the beginning of the changeover of the coupling. The step for providing the transition torque subsequently provides a transition torque by means of the second drive unit, which transition torque corresponds to the determined first drive torque. Consequently, no losses of comfort occur during the changeover of the coupling in the transmission.

According to a further embodiment, during the step of providing the transition torque by means of the second drive unit, the transition torque is adapted on the basis of a driving command during the changeover of the coupling. This makes it possible, even during the coupling changeover operation, to adapt or to vary the drive torque at the output of the drive mechanism. In particular, the drive torque can therefore be increased or reduced even during the coupling changeover operation in order thus, for example even during the changeover of the coupling, to change a speed of a vehicle or to adapt the required drive torque because of ascents or descents in the driving route.

Further embodiments and advantages of the present invention emerge from the description below with reference to the attached drawings.

DETAILED DESCRIPTION

Figure 1:
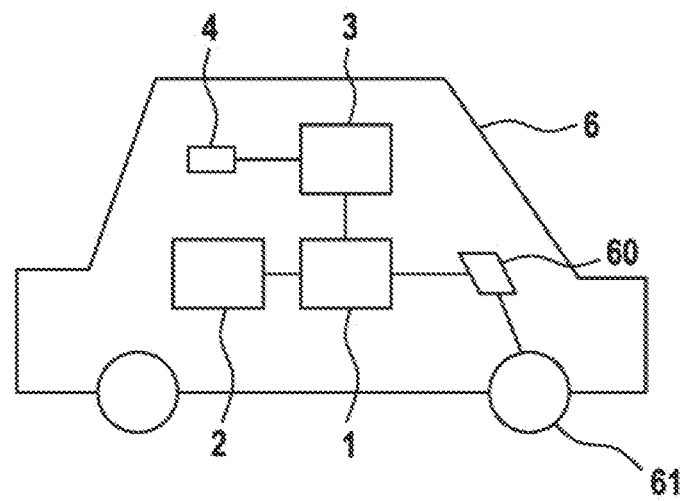
FIG. 1 shows a schematic illustration of a motor vehicle with a drive mechanism according to one embodiment.

FIG. 1 shows a schematic illustration of a motor vehicle 6 with a drive mechanism 1 according to one embodiment. The drive mechanism 1 is coupled here both to a first drive unit 2 and to a second drive unit 3. The first drive unit 2 can be, for example, an internal combustion engine. Furthermore, however, any other drive units are also possible. In particular, the first drive unit 2 can be a drive unit, the provided drive torque (torque) of which depends on a rotational speed of the drive unit. For adaptation of the rotational speed of the first drive unit 2 depending on the speed of the vehicle 6, the drive mechanism 1 has a transmission. This transmission of the drive mechanism 1 can be what is referred to as a dual clutch transmission (DCT). Such a dual clutch transmission comprises two partial transmissions which can each be connected to a drive unit via a separate clutch. In the example illustrated here, the first drive unit 2, i.e., for example, an internal combustion engine, can be coupled to the respective partial transmission of the dual clutch transmission via one of the two clutches of the dual clutch transmission. On the output side, the two partial transmissions of the dual clutch transmission can be connected to each other. The output of the dual clutch transmission can then be connected to the driving wheels 61 of the vehicle 6 either directly or optionally via a differential 60 and optionally further components.

The vehicle 6 furthermore comprises a second drive unit 3. This second drive unit 3 can be, for example, an electric drive. In this case, the second drive unit 3 can be fed by a traction battery 4 via a power converter. The second drive unit 3 is fixedly coupled here to a drive train in one of the two partial transmissions of the dual clutch transmission. That is to say, a releasable clutch is not provided between the second drive unit 3, i.e. the electric motor of an electric drive, and the corresponding drive train of the dual clutch transmission. The electric motor of the electric drive is coupled to the corresponding drive train of the dual clutch transmission with a fixedly predefined transmission ratio.

Figure 2:
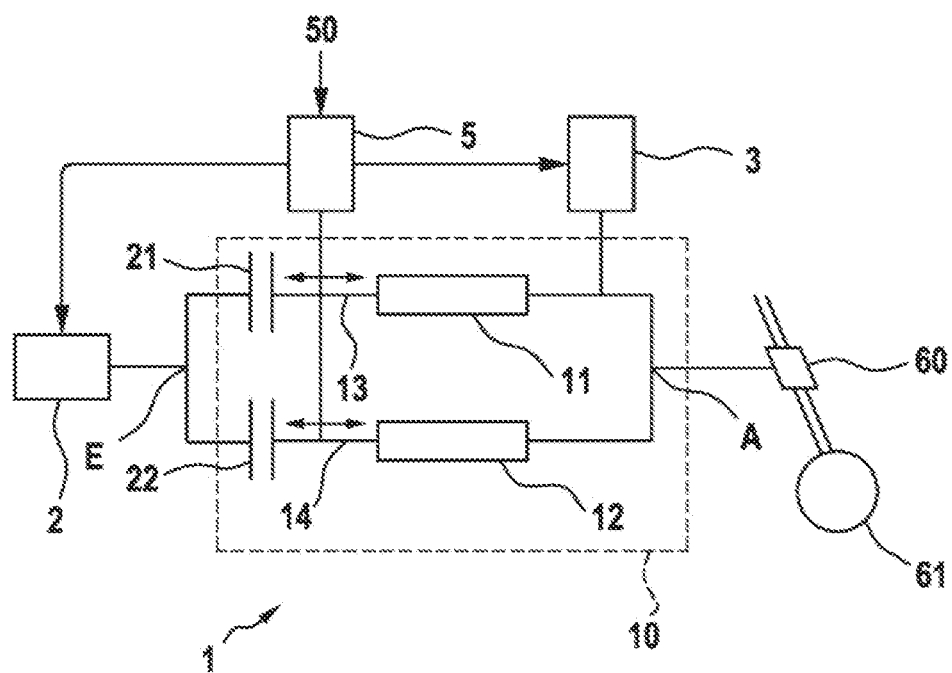
FIG. 2 shows a schematic illustration of a drive mechanism for a motor vehicle according to one embodiment.

FIG. 2 shows a schematic illustration of a block circuit diagram as at the basis of a drive mechanism 1 according to one embodiment. The drive mechanism 1 here comprises a dual clutch transmission 10. The function of said dual clutch transmission 10 can be controlled here by a control device 5. The dual clutch transmission 10 comprises a first drive train 13 which is connectable to the first drive unit 2 via a first clutch 21. If the first clutch 21 is closed here, there is a force-fitting connection between the first drive unit 2 and the first drive train 13, and therefore the drive torque of the first drive unit 2 acts on the first drive train 13 via the first clutch 21. The first drive train 13 comprises a first partial transmission 11. By means of said first partial transmission 11, a predetermined transmission ratio can be set between the input E and the output A of the dual clutch transmission 10. For this purpose, a desired shifting state from a plurality of possible shifting states can be set in the first partial transmission 11. For example, the first partial transmission can comprise the gears 1, 3, 5, R and N, wherein R stands for a reversing movement here and N for a neutral position of the transmission. Analogously to the first drive train 13, the second drive train 14 comprises a second clutch 22 via which the second drive train 14 can be coupled to the first drive unit 2. Furthermore, a second partial transmission 12 can be provided in the second drive train 14. Further transmission ratios between the input E and the output A of the dual clutch transmission 10 can be set by said second partial transmission 12. For example, the gears 2, 4, 6 and N can be set by said second partial transmission. Preferably, but not imperatively, the transmission ratios between the first partial transmission 11 and the second partial transmission 12 alternate in an increasing size. The output of the dual clutch transmission 10 can be coupled to the driving wheels 61 of a vehicle via a differential 60 and/or further structural elements.

The first drive train 13 is furthermore coupled to a second drive unit 3, for example an electric drive. Said electric drive of the second drive unit 3 can comprise an electric motor and optionally also further components, such as, for example, power converters, etc. The second drive unit 3 is fixedly coupled here to the first drive train 13. Such a fixed coupling between the second drive unit 3 and the first drive train 13 should be understood here as meaning that there is no clutch between the second drive unit 3 and the first drive train 13. Also, no further mechanism is provided between the second drive unit 3 and the first drive train 13, which mechanism can be temporarily opened during normal operation in order to interrupt a force-fitting connection between the second drive unit 3 and the first drive train 13. In other words, the second drive unit 3 is permanently connected to the first drive train 13, wherein a fixed, predetermined transmission ratio is provided between the second drive unit 3 and the first drive train 13. For example, one or more gear wheels which directly intermesh can be provided between a shaft of an electric motor of the second drive unit 3 and a shaft of the first drive train 13. The second drive unit 3 is coupled here in particular to a region of the drive mechanism 1 downstream of the first partial transmission 11. Consequently, the second drive mechanism 3 can then also exert a torque on the wheels 61 of a vehicle 6 when the partial transmissions 11 and 12 are in a neutral position N or when both clutches 21 and 22 of the dual clutch transmission 10 are opened.

For changing over the coupling of the dual clutch transmission 10, that is to say changing the transmission ratio between input E and output A of the dual clutch transmission 10, the control device 5 can transmit an electric or mechanical shifting command to the first partial transmission 11 and the second partial transmission 12. Furthermore, the control device 5 can also control or at least monitor the opening or closing of the first clutch 21 and the second clutch 22. In this manner, an entirely or partially automatic change of gear for changing the transmission ratio between input E and output A of the dual clutch transmission 10 is possible. For this purpose, the control device 5 can receive, for example, a corresponding shifting command 50 for shifting up or down, or a shifting command for engaging a certain gear.

Although the coupling of the second drive unit 3 to the first drive train 13 has been described above, it is alternatively also possible to couple the second drive unit 3 to the second drive train 14. Furthermore, the cited assignment of the individual gears to the first partial transmission 11 and the second partial transmission 12 also serves only for better understanding and does not constitute a limitation of the present invention. The different assignment of gears to the individual partial transmissions 11 and 12 is likewise possible.

The changeover of the coupling, i.e. the change of the transmission ratio between input E and output A of the dual clutch transmission 10, will now be described below, wherein a drive torque is provided at the input E of the dual clutch transmission 10 by means of the first drive unit 2 prior to and after the changeover of the coupling. Furthermore, it is not required for a drive torque to be provided by means of the second drive unit 3 prior to or after the changeover of the coupling. To support the first drive unit 2, an additional drive torque can be provided by means of the second drive unit 3 prior to or after the coupling changeover operation.

If a changeover of the coupling in the dual clutch transmission 10 is now intended to take place, in order to implement a gear change, for this purpose, for example, the control device 5 can receive a corresponding control command 50. Subsequently, the control device 5 activates the second drive unit 3 in such a manner that an output torque at the output A of the dual clutch transmission 10, which output torque arises by means of the drive torque of the first drive unit 2, is now completely taken over by the second drive unit 3 prior to the changeover of the coupling. For this purpose, the control device 5 can determine the drive or output torque provided by the first drive unit 2. For example, it is possible that the control device 5 uses a suitable measurement technique or sensor arrangement to sense the drive or output torque provided by the first drive unit 2. Furthermore, however, the control device 5 can also sense further operating parameters of the first drive unit 2 and, on the basis of said further operating parameters, calculate or at least estimate the drive torque of the first drive unit 2. For example, for this purpose, the control device 5 can evaluate the current fuel consumption, the quantity of air supplied to the first drive unit 2, the current rotation speed and/or further operating parameters. From said operating parameters of the first drive unit 2, the control device 5 can thereupon calculate the drive or output torque provided by the first drive unit 2, or can determine same by means of a look-up table or the like. The control device 5 can subsequently activate the second drive unit 3 in such a manner that a transition drive torque is provided which corresponds to the output torque of the first drive unit 2 at the beginning of the changeover of the coupling. For this purpose, the control device 5 can, for example, appropriately set voltage or current of an electric drive. At the same time, the supply of energy (quantity of fuel, etc.) to the first drive unit 2 can be correspondingly reduced, and therefore the entire drive torque for driving the vehicle 6 is provided by the second drive unit 3, i.e. the electric drive.

If the maximum power output of the second drive unit 3 is limited, the control device 5, after determining the torque provided by the first drive unit 2, can check whether the second drive unit 3 can provide a drive torque of a corresponding size. If the second drive unit 3 cannot provide the required drive torque, the requested changeover of the coupling can initially be suppressed. The control device 5 can transmit a corresponding signal, which rejects the requested changeover of the coupling, for example to a further monitoring unit of the vehicle. Alternatively, it is also possible to initially delay the requested changeover of the coupling in order, for example, to wait until the drive torque of the first drive unit 2 is reduced. Furthermore, it is moreover also possible to allow a changeover of the coupling if the maximum drive torque which can be provided by the second drive unit 3 falls short of the current output torque of the first drive unit 2 by less than a predetermined threshold value. It is therefore possible that if the second drive unit 3 cannot completely take over the drive torque of the first drive unit 2, the changeover of the coupling nevertheless takes place, with the second drive unit 3 then being operated as far as possible with the maximally permissible drive torque.

It is assumed for the description below that, prior to the changeover of the coupling, a drive torque is transmitted from the first drive unit 2 by the input E of the dual clutch transmission 10 and furthermore via the first clutch 21 and the first partial transmission 11 to the output A of the dual clutch transmission 10 and is provided there as an output torque. The second partial transmission 12 is located here in a neutral position and/or the second clutch 22 is open. After the changeover of the coupling, the drive torque of the first drive unit 2 is intended to be transmitted via the input E and the second clutch 22, and also via the second partial transmission 12 to the output A of the dual clutch transmission. The first partial transmission 11 is then intended to be in the neutral position and/or the first clutch 21 is intended to be open. However, the present invention is not restricted to this changeover of the coupling situation. It is moreover also possible that, prior to the changeover of the coupling, the transmission of torque takes place via the second drive train 14 with the second clutch 22 and the second partial transmission 12 and, after the changeover of the coupling, the transmission of torque takes place via the first drive train 13 with the first partial transmission 11 and the first clutch 21. A changeover of the coupling is also possible in which, prior to and after the changeover of the coupling, the transmission of torque takes place in each case via the first drive train 13 with the first partial transmission 11 and the first clutch 21, or alternatively also, prior to and after the changeover of the coupling, the transmission of torque takes place via the second drive train 14 with the second partial transmission 12 and the second clutch 22.

If the control device 5 receives a command to change over the coupling, the control device 5 then, as already described previously, sets a transition drive torque at the drive unit 3, said transition drive torque completely or at least as far as possible taking over the output torque provided previously by the first drive unit 2. At the same time, the drive torque provided by the first drive unit 2 is reduced. The first clutch 21 and, if not already open, also the second clutch 22 are then opened. The first drive unit 2 is then completely decoupled from the output A of the dual clutch transmission. The drive therefore takes place completely by means of the second drive unit 3. After the desired shifting state has been set in the second partial transmission 12, the second clutch 22 can be closed, and therefore there is a force-fitting connection between input E and the second partial transmission 12. A neutral position can optionally be set in the first partial transmission 11, and therefore, even after the first clutch 21 is closed, force is not transmitted between input E and output A via the first partial transmission 11.

After the desired shifting state has been set in the second partial transmission 12 and the clutch 22 has been closed, the drive torque can be raised by the first drive unit 2 and at the same time the transition drive torque can be reduced by the second drive unit 3. At the end of this operation, the drive torque of the vehicle is then provided completely by the first drive unit 2. It is also possible that, for further support, optionally even after the changeover of the coupling is finished, the second drive unit 3 provides a supplementary drive torque in order additionally to increase the torque at the output A of the dual clutch transmission 10.

Figure 3:
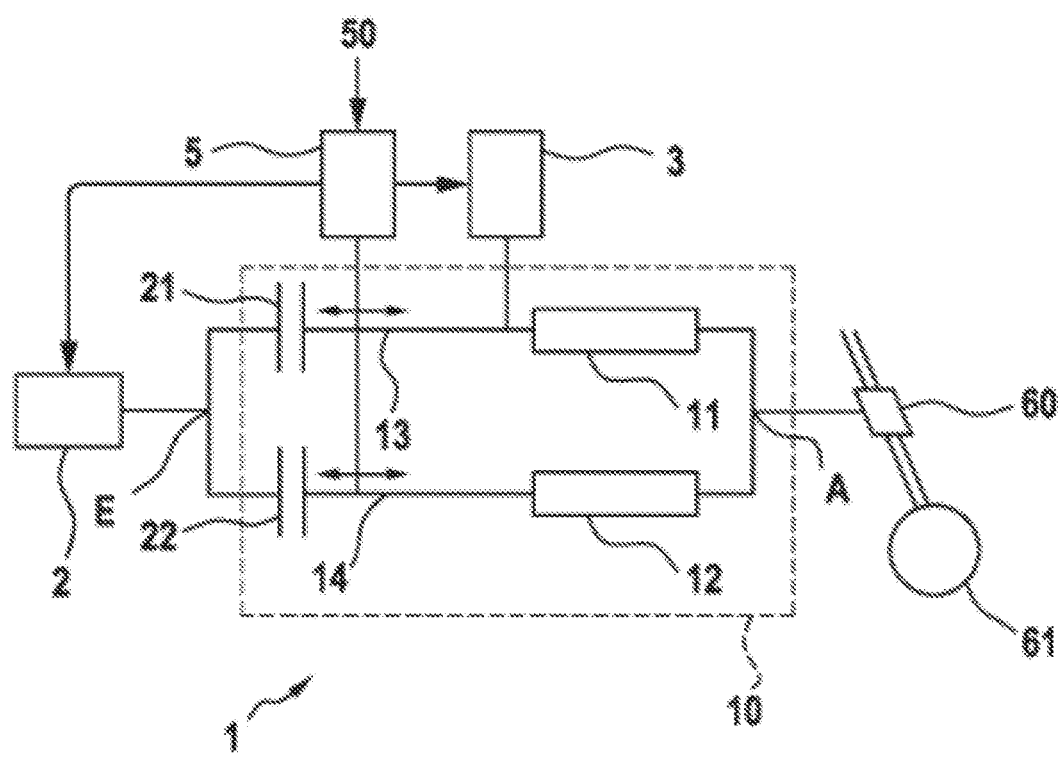
FIG. 3 shows a schematic illustration of a drive mechanism for a motor vehicle according to a further embodiment.

FIG. 3 shows a schematic illustration of a block circuit diagram as at the basis of a drive mechanism 1 according to a further embodiment. The drive mechanism 1 differs here from the previously described drive mechanism 1 according to FIG. 2 insofar as the second drive unit 3 here is coupled between the first clutch 21 and the first partial transmission 11 to the first drive train 13. Since, in this case, the drive torque from the second drive unit 3 is integrated upstream of the first partial transmission 11, as seen in the direction of the differential 60, it is possible that different transmission ratios can be selected by means of the first partial transmission 11. The second drive unit 3 can therefore thereby use the gears of the first partial transmission 11, as a result of which said gears can be designed to be smaller or can introduce more torque. However, this advantage is obstructed by the restriction that it may not be possible to change between two gears of the first partial transmission 11 without an interruption in tractive force. By contrast, a change between two gears of the second partial transmission without an interruption in tractive force is also possible in this embodiment.

Figure 4:
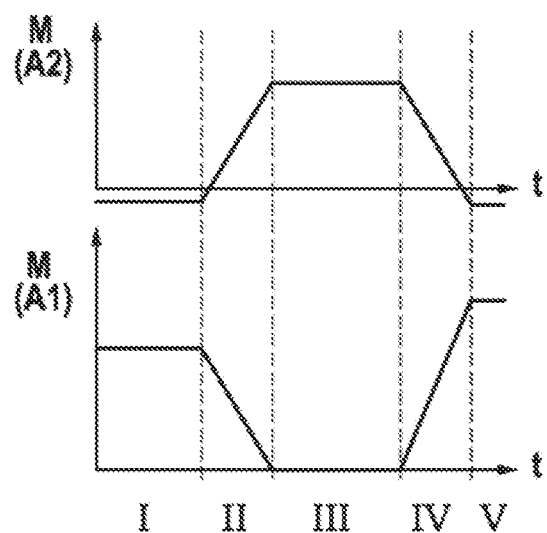
FIG. 4 shows a schematic illustration of a profile of the drive torques as they can occur during the changeover of the coupling according to one embodiment.

FIG. 4 shows a schematic illustration of the torque profile of the first drive unit 2 (at the bottom) and of the second drive unit 3 (at the top) during the changeover of the coupling. In a first phase I prior to the changeover of the coupling, the drive torque is generally completely provided by the first drive unit 2. Since the second drive unit 3 is fixedly coupled to a drive train, a slightly negative torque may occur in the second drive unit 3 because of frictional losses or the like. At the beginning of the changeover of the coupling, the drive torque provided by the first drive unit 2 is now completely taken over by the second drive unit 3. During the second phase II, the drive torque to be provided by the first drive unit 2 therefore drops while the drive torque provided by the drive unit 3 rises. While the new shifting states are set in the partial transmissions 11 and 12, the drive torque is completely taken over by the second drive unit 3 in the third phase III. Subsequently, in the fourth phase IV, the drive torque provided by the first drive unit 2 is again continuously increased and analogously the transition drive torque from the second drive unit 3 is continuously reduced until, finally, in the fifth phase V, the drive torque is completely taken over again by the first drive unit 2. On account of the changed transmission ratio during the changeover of the coupling, the drive torque which has to be output by the first drive unit 2 at the end of the changeover of the coupling can deviate from the drive torque at the beginning of the changeover of the coupling. Nevertheless the drive torque provided at the wheels 61 of the motor vehicle 6 generally remains constant during the entire changeover of the coupling.

Furthermore, it is possible that, even during the changeover of the coupling, the drive torque at the wheels 61 can be varied. If, for example, it emerges from the driving requirement of a vehicle driver that the vehicle is intended to be accelerated or deaccelerated, then, even during the changeover of the coupling, for example by corresponding activation of the second drive unit 3, the drive torque can be correspondingly adapted. Also for as constant a driving speed as possible in hilly terrain, or in order to take into account further boundary conditions, it may optionally be required for the drive torque which is intended to be provided by the second drive unit 3 during the changeover of the coupling to be varied. Accordingly, for example, the control device 5 can activate the second drive unit 3 in a suitable manner on the basis of driving commands 50.

Figure 5:
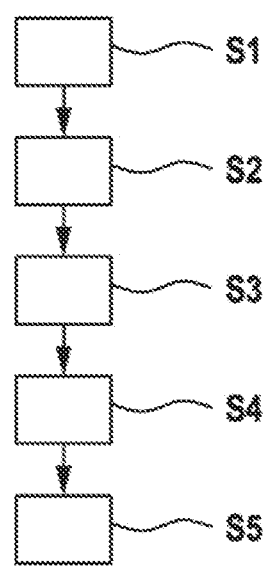
FIG. 5 shows a schematic illustration of a sequence diagram as at the basis of a method for operating a drive mechanism according to one embodiment.

FIG. 5 shows a schematic illustration of a sequence diagram as at the basis of a method for operating a drive mechanism for a motor vehicle according to one embodiment. First of all, in step S1, a first drive torque is provided to one of the drive trains 13 or 14 of a dual clutch transmission 10 by means of a first drive unit 2. If a changeover of the coupling is then intended to take place, first of all, in step S2, the drive torque provided by the first drive unit 2 can be determined. Said drive torque, as already explained previously above, can be determined. Then, in step S3, a transition drive torque is provided by means of a second drive unit 3 which is fixedly coupled to one of the drive trains 13 or 14 of the dual clutch transmission 10. The transition drive torque provided by the second drive unit 3 as completely as possible compensates for the drive torque provided previously by the first drive unit 2, and therefore a constant drive torque is always provided at the output A of the dual clutch transmission 10. Subsequently, in step S4, the changeover of the coupling of the dual clutch transmission 10 takes place. In this connection, the setting in one or in both partial transmissions 11, 12 of the dual clutch transmission 10 is adapted in accordance with the desired shifting operation. If, during said changeover of the coupling, a variation of the drive torque at the wheels 61 of a vehicle 6 is required, then, even during the changeover of the coupling, the transition drive torque provided by the second drive unit 3 can be correspondingly adapted in step S4. Subsequently, in step S5, the drive torque of the first drive unit 2 is increased again and at the same time the drive torque of the second drive unit 3 is reduced. Subsequently, the drive torque for the motor vehicle is preferably completely provided again by the first drive unit 2.

In summary, the present invention relates to a drive mechanism for a motor vehicle and to a method for operating such a drive mechanism. The drive mechanism here comprises a dual clutch transmission, the input of which is coupled to a first drive unit. Furthermore, the drive mechanism comprises a further drive unit which is fixedly coupled to one of the drive trains of the dual clutch transmission. During the changeover of the coupling, the drive torque is completely taken over by the further drive unit. A changeover of the coupling without an interruption in the tractive force, in which the clutches of the dual clutch transmission are only minimally loaded, is therefore possible.

What is claimed is:

1. A drive mechanism (1) for a motor vehicle (6), comprising: a dual clutch transmission (10) with a first drive train (13) which is connectable to a first drive unit (2) via a first clutch (21), and with a second drive train (14) which is connectable to the first drive unit (2) via a second clutch (22), wherein the first drive train (13) is fixedly coupled to a second drive unit (3); and wherein, during a changeover of the coupling of the dual clutch transmission (10), a predetermined drive torque is provided by the second drive unit (3), wherein the drive mechanism (1) further includes a control device (5) which is configured, before the changeover of the coupling of the dual clutch transmission (10), to determine either a first drive torque which is provided by the first drive unit (2) or an output torque at an output (A) of the dual clutch mechanism that arises via the first drive unit (2), wherein the drive torque provided by the second drive unit (3) is configured to be set based on the determined first drive torque or the determined output torque, and wherein the control device (5) is configured to allow the changing over of the coupling of the dual clutch transmission (10) only if the second drive unit (3) provides a drive torque that does not fall below the determined first drive torque or the determined output torque by more than a predetermined threshold value.

2. The drive mechanism (1) as claimed in claim 1, wherein the control device (5) is furthermore configured to reduce the drive torque provided by the second drive unit (3) after the changeover of the coupling of the dual clutch transmission (10) is finished.

3. A motor vehicle (6), comprising:
the drive mechanism (1) as claimed in claim 1.

4. The motor vehicle (1) as claimed in claim 3, wherein the second drive unit (3) comprises an electric motor.

5. A method for operating a drive mechanism (1) for a motor vehicle (6), comprising the following steps:
providing (S1) a first drive torque by means of a first drive unit (2) to one of the drive trains (13, 14) of a dual clutch transmission (10);
providing (S3) a transition torque by means of a second drive unit (3) which is fixedly coupled to one of the drive trains (13, 14) of the dual clutch transmission (10);
changing over the coupling (S4) of the dual clutch transmission (10); and
providing (S5) a second drive torque by means of the first drive unit (2) to one of the drive trains (13, 14) of the dual clutch transmission (10);
wherein, prior to the changing over of the coupling, either the first drive torque of the first drive unit (2) or an output torque of the dual clutch transmission (10) at an output (A) of the dual clutch mechanism that arises via the first drive unit (2) is determined, and wherein the transition torque provided by the second drive unit (3) is set based on the determined first drive torque or the determined output torque, and wherein the changing over of the coupling of the dual clutch transmission (10) occurs only if the second drive unit (3) provides a transmission torque that does not fall below the determined first drive torque or the determined output torque by more than a predetermined threshold value.

6. The method as claimed in claim 5, furthermore comprising a step (S2) for determining the first drive torque, wherein the step (S3) for providing the transition torque provides a transition torque by means of the second drive unit (3), which transition torque corresponds to the first determined drive torque.

7. The method as claimed in claim 5, wherein during the step (S3) for providing a transition torque the provided transition torque is adapted on the basis of a driving command (50) during the changeover of the coupling.

* * * * *